(12) United States Patent
Presby (10) Patent No.: US 12,018,223 B2
(45) Date of Patent: Jun. 25, 2024

(54) BIOFUEL AND METHOD OF BIOFUEL PRODUCTION

(71) Applicant: David W. Presby, Sugar Hill, NH (US)

(72) Inventor: David W. Presby, Sugar Hill, NH (US)

( * ) Notice: Subject to any disclaimer, the term of this patent is extended or adjusted under 35 U.S.C. 154(b) by 2 days.

(21) Appl. No.: 17/533,980

(22) Filed: Nov. 23, 2021

(65) Prior Publication Data
US 2022/0177794 A1 Jun. 9, 2022

Related U.S. Application Data

(60) Provisional application No. 63/118,099, filed on Nov. 25, 2020.

(51) Int. Cl.
*C10L 5/08* (2006.01)
*C10L 5/36* (2006.01)

(52) U.S. Cl.
CPC ............... *C10L 5/363* (2013.01); *C10L 5/08* (2013.01); *C10L 2200/0469* (2013.01); *C10L 2290/30* (2013.01); *C10L 2290/32* (2013.01)

(58) Field of Classification Search
CPC .... C10L 5/363; C10L 5/08; C10L 2200/0469; C10L 2290/30; C10L 2290/32; C10L 5/36; C10L 5/44; Y02E 50/30
See application file for complete search history.

(56) References Cited

U.S. PATENT DOCUMENTS

| | | | |
|---|---|---|---|
| 209,069 A | 10/1878 | Norris | |
| D24,313 S | 5/1895 | Taggart | |
| D27,484 S | 8/1897 | Zwoyer | |
| D33,520 S | 11/1900 | Davis | |
| 738,136 A | 9/1903 | White | |
| 1,267,711 A | 5/1918 | Sutcliffe | |
| 1,497,866 A | 6/1924 | Marchosky | |
| D88,351 S | 11/1932 | Herrly | |
| 3,883,317 A * | 5/1975 | Neme | C10L 5/36 44/520 |
| 4,060,396 A | 11/1977 | Burton | |
| D272,760 S | 2/1984 | Koziol | |
| D272,847 S | 2/1984 | Koziol | |
| 4,496,366 A | 1/1985 | Peters | |
| 5,858,032 A | 1/1999 | Hardy et al. | |
| 5,912,192 A * | 6/1999 | Kim | C10L 11/04 44/598 |
| 6,027,539 A | 2/2000 | Toy | |
| 6,152,973 A | 11/2000 | Romell | |
| 6,913,631 B2 | 7/2005 | Lefevre | |
| D517,473 S | 3/2006 | Jackson | |
| D548,682 S | 8/2007 | Melin et al. | |

(Continued)

FOREIGN PATENT DOCUMENTS

DE 20211746 U1 * 1/2003 .............. B01J 2/20

OTHER PUBLICATIONS

Machine Translation of DE20211746U1 (Year: 2003).*

*Primary Examiner* — Ellen M McAvoy
*Assistant Examiner* — Ming Cheung Po
(74) *Attorney, Agent, or Firm* — Finch & Maloney PLLC (57) ABSTRACT

A biofuel pellet and an apparatus for making the pellet are provided. The biofuel pellet includes a first region of high density and a second region of low density. The higher density region burns more slowly than the low density region and helps to suspend the pellet for longer and more complete combustion.

10 Claims, 6 Drawing Sheets

(56) References Cited

U.S. PATENT DOCUMENTS

| | | |
|---|---|---|
| D555,585 S | 11/2007 | Saunders et al. |
| D560,603 S | 1/2008 | Saunders et al. |
| D560,604 S | 1/2008 | Saunders et al. |
| D561,090 S | 2/2008 | Saunders et al. |
| D561,091 S | 2/2008 | Saunders et al. |
| D561,686 S | 2/2008 | Saunders et al. |
| D588,057 S | 3/2009 | Soler My |
| D600,636 S | 9/2009 | Howell |
| D628,147 S | 11/2010 | Swatling et al. |
| D635,505 S | 4/2011 | Beech |
| D649,511 S | 11/2011 | Christensen et al. |
| 8,137,420 B2 | 3/2012 | Kluko |
| 2007/0289204 A1 | 12/2007 | Kahlen |
| 2010/0183783 A1* | 7/2010 | Meier ........................ C10L 5/44 426/240 |
| 2010/0293846 A1 | 11/2010 | Shaffer |
| 2019/0100709 A1* | 4/2019 | Long ........................ C10L 5/361 |
| 2020/0362257 A1* | 11/2020 | Hodsdon ................... C10L 5/36 |

\* cited by examiner

BIOFUEL AND METHOD OF BIOFUEL PRODUCTION

RELATED APPLICATIONS

This application claims benefit of U.S. Provisional Application Ser. No. 63/118,099, filed Nov. 25, 2020 and titled BIOFUEL AND METHOD OF BIOFUEL PRODUCTION.

TECHNICAL FIELD

This application relates generally to the production of biofuel and, more specifically, to the production of biofuel pellets from wood and wood products.

BACKGROUND

Biofuels include materials produced from plants such as wood, grass, and ethanol that can be burned to recover energy. A popular form of biofuel is a wood pellet that can be burned in a pellet stove or pellet furnace. Wood pellets are typically extruded and dried prior to shipment and use.

SUMMARY

In one implementation, a compressed biofuel comprises a pellet. The pellet has a central region and a peripheral region. The central region exhibits a first density and the peripheral region exhibits a second density. The first density is less than the second density. In some cases, the pellet comprises essentially the same material throughout. In some cases, the pellet comprises wood. In some cases, the compressed biofuel does not include a binder. In some cases, the pellet is lenticular. In some cases, the pellet is rectangular. In some cases, the pellet is not cylindrical. In some cases, the pellet has at least one dimension greater than one inch. In some cases, the second density is at least 1.5 times greater than the first density. In some cases, the pellet comprises a hole therethrough.

In another implementation, a method of making a biofuel pellet comprises feeding a biofuel precursor into a cavity. The method further comprises compressing the biofuel precursor into a first region of high density and a second region of low density to produce a pellet. The method further comprises removing the resulting pellet from the cavity.

In another implementation, an apparatus for manufacturing biofuel pellets comprises a body having formed therein a cylindrical cavity having a first longitudinal axis. The apparatus further comprises a first piston having a first piston rod coupled to a first piston head. The first piston head is dimensioned such that it can be at least partially positioned within the cylindrical cavity. The apparatus further comprises a second piston having a second piston rod coupled to a second piston head. The second piston head is dimensioned such that it can be at least partially positioned within the cylindrical cavity. The first and second piston heads each have a concave surface, the concave surfaces of the first and second piston heads oriented to face each other along the first longitudinal axis. In some cases the first and second piston heads each have an annular flat surface that surrounds the concave surface. In some cases the apparatus further comprises a screw drive configured to supply biofuel precursor to the cylindrical cavity. In some cases (a) the first piston rod is rotatably coupled to a first rotatable crankshaft such that the first piston head moves between positions of maximum extension and maximum extraction as the first crankshaft rotates; (b) the second piston rod is rotatably coupled to a second rotatable crankshaft such that the second piston head moves between positions of maximum extension and maximum extraction as the second crankshaft rotates; and (c) the first and second piston heads are separated by a gap when both are at positions of maximum extension. In some cases the apparatus further comprises a hollow feed tube formed in the body, the hollow feed tube including a valve that provides a connection between the hollow feed tube and the cylindrical cavity. In some cases (a) a second cylindrical cavity is formed in the body, the second cylindrical cavity having a second longitudinal axis that is parallel to the first longitudinal axis; (b) the apparatus further comprises a third piston having a third piston rod coupled to a third piston head, wherein the third piston head is dimensioned such that it can be at least partially positioned within the second cylindrical cavity; (c) the apparatus further comprises a fourth piston having a fourth piston rod coupled to a fourth piston head, wherein the fourth piston head is dimensioned such that it can be at least partially positioned within the second cylindrical cavity; and (d) the third and fourth piston heads each have a concave surface, the concave surfaces of the third and fourth piston heads oriented to face each other within the second cylindrical cavity.

The systems, devices, and methods described herein may be used separately or together, and components or techniques described in relation to one system or method are capable of being implemented with the others. The subject matter of this application may involve, in some cases, interrelated products, alternative solutions to a particular problem, and/or a plurality of different uses of a single system or article.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings.

DETAILED DESCRIPTION

Described herein is a biofuel pellet and method for producing the same. The biofuel pellet can be made from wood or other cellulosic material and can include areas of two distinctly different densities. Also disclosed is an apparatus for producing a biofuel pellet. In one set of embodiments, the biofuel pellets are generally lenticular in shape and are thinner at the periphery and thicker in the middle. The thinner portion at the periphery is of higher density than the thicker portion in the central region. When combusted, the pellets tend to burn more quickly in the less dense central region than in the exterior peripheral region. Thus, as the central portion of the pellet burns the periphery stays intact and is the last to be consumed. This prevents the biofuel pellet from slipping through a grate before it has been substantially burned. Previously, as conventional pellets would burn from the outside in, they would decrease in size until they dropped through the grate or other support and could no longer be completely combusted or would gather at the bottom of the firebox.

In another aspect an apparatus is provided that can achieve continuous production of biofuel pellets exhibiting variable density. The apparatus can include one or more cylinders that can be in any orientation. In some implementations the cylinder or cylinders are oriented vertically, while in other implementations the cylinder or cylinders are oriented horizontally. The bottom surface of the interior of the cylinder may include a concave indentation for shaping the pellet. A preselected amount of biofuel precursor, for example sawdust or wood chips, is fed into the cylinder. A piston that includes a concave piston head, that can be a mirror image of the bottom of the cylinder, is advanced into the cylinder and compresses the biofuel precursor into a lenticular shape. The piston provides enough pressure and heat to form the material into a dense, solid shape that in many instances does not require the use of a binder. The piston is withdrawn from the cylinder and the biofuel pellet is ejected. The piston may be powered by a rotating crankshaft that can also be used to power adjacent cylinders in the same apparatus. For example, an apparatus may include two, three, four, five, six or eight cavities and pistons that are in mechanical communication with the same crankshaft. To assure that an adequate force is provided to the cellulosic material when the piston is fully extended, the connecting rods on the crankshaft may alternate with each other around the periphery of the shaft. For example, in a two-cylinder system, when the crankshaft is compressing one of the cylinders to its lowest position, the second piston is allowed to return to its retracted position.

Figure 1A:
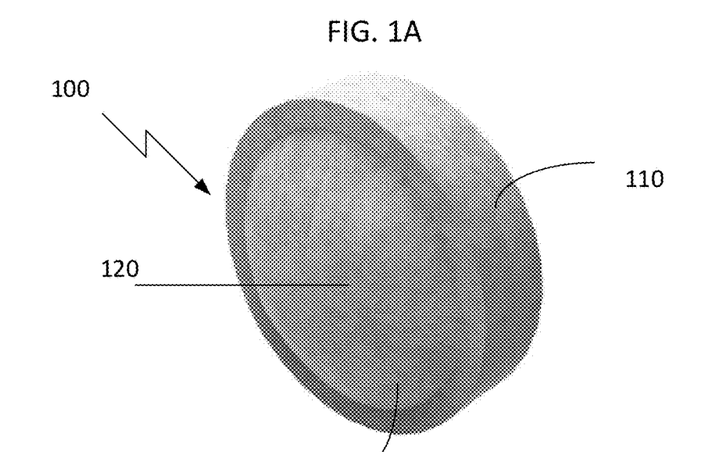
FIG. 1A is a photograph of an example implementation of a biofuel pellet.
Figure 1B:
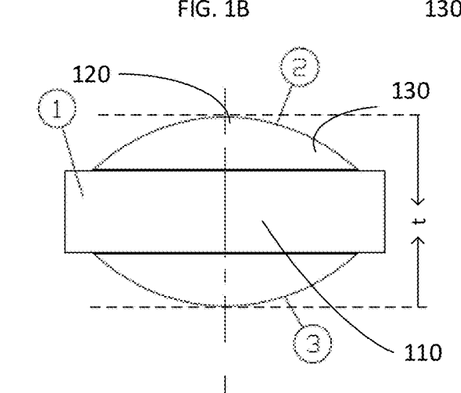
FIG. 1B is a horizontal side view of an example implementation of a biofuel pellet.
Figure 1C:
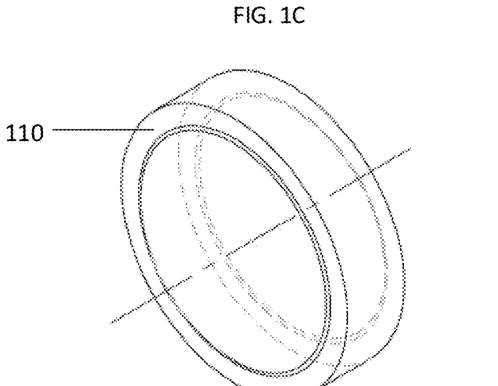
FIG. 1C is a perspective view of an example implementation of a biofuel pellet.
Figure 1D:
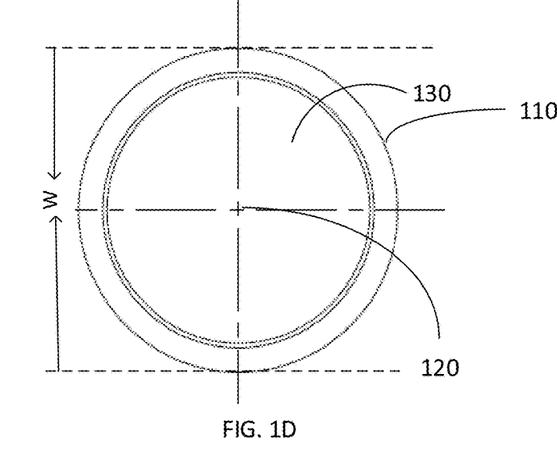
FIG. 1D is a top-down view of an example implementation of a biofuel pellet.
Figure 1E:
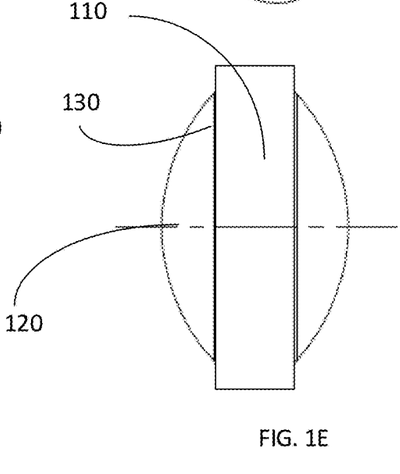
FIG. 1E is a vertical side view of an example implementation of a biofuel pellet.

FIGS. 1A through 1E illustrate an example implementation of a biofuel pellet. As shown, a pellet 100 can include a peripheral annular portion 110, a central portion 120, and an intermediate portion 130. In various embodiments the transition from peripheral portion 110 to central portion 120 can be continuous or can be stepped, as shown in FIG. 1A. In a stepped version, peripheral portion 110 may be a cylindrical ring, as shown. In other cases, a pellet is a continuous lenticular shape that extends consistently from a rounded edge portion to a thicker central portion. In the example implementation illustrated in FIG. 1A through FIG. 1E, the density of the material is greatest in peripheral portion 110 and lowest in central portion 120. In cross-section, as shown in FIG. 1D, the mass of material at any position through the cross-section can be equal or about equal, +/−10%. For example, a core of material taken from central portion 120 would have the same or similar mass as the same diameter core of material taken from peripheral portion 110. Thus, while the volumetric density varies from edge to center, the areal density can be essentially constant across the width of pellet 100. For instance, the volumetric density between the edge and the center can vary by more than 1.5:1, more than 2:1 or more than 3:1 while the ratio of the two areal densities, from the viewpoint of FIG. 1D, can be less than 1.5:1, less than 1.3:1 or less than 1.2:1.

Pellet 100 may be of any dimension that is suitable for combustion. In some embodiments, the width w of pellet 100, as shown in FIG. 1D, can be greater than 0.5 inch, greater than 1.0 inch, greater than 1.5 inches, greater than 2 inches, or greater than 2.5 inches. In the same and other embodiments, the width can be less than 5 inches, less than 4 inches, less than 3 inches, less than 2 inches, or less than 1 inch. The thickness t of pellet 100, as shown in FIG. 1B, can be greater than 0.5 inch, greater than 1 inch, or greater than 1.5 inches. In the same and other embodiments, the thickness can be less than 3 inches, less than 2 inches, less than 1 inch, or less than 0.5 inch. The ratio of width to thickness can be greater than 1:1, greater than 2:1, or greater than 3:1. In other embodiments the ratio of width to thickness can be less than 20:1, less than 10:1, less than 5:1, or less than 2:1. The variance in thickness from peripheral portion 110 to central portion 120 can be greater than 1:1, greater than 1.5:1, greater than 2:1, or greater than 3:1.

The volumetric density of pellet 100 can vary between the densest portion and the least dense portion by a factor of greater than 1.2, greater than 1.5, greater than 2.0, greater than 2.5, or greater than 3.0. Similarly, the hardness of the different portions can vary as well, with peripheral portion 110 typically being the hardest and central portion 120 being the least hard. Hardness of pellet 100 between peripheral portion 110 and central portion 120 can vary by greater than 100 lbf, greater than 200 lbf, greater than 500 lbf, or greater than 1000 lbf using the Janka hardness test. The absolute hardness of the pellet surface can be greater than 200 lbf, greater than 400 lbf, greater than 600 lbf, greater than 800 lbf, or greater than 1000 lbf.

In some embodiments, pellet 100 is comprised of a single, homogenous material. For example, the only material may be a specific sawdust from a lumber mill, wood chips from a timber operation, or waste paper from consumer recycling. In other cases, pellet 100 can be made from a mixture of materials, such as a mixture of two or more of sawdust, paper chips, wood chips, and cardboard. Other materials that can be used in pellet 100, exclusively or mixed, include paper, cardboard, wood waste, grasses, plastic, charcoal, and peat. Particle size of the starting material can vary and in certain embodiments can be 1 mm to 10 mm, 0.5 mm to 5 mm, less than 1 inch, less than 0.5 inch, or less than 0.25 inch. Pellet 100 can be void of added binders such as polymers, solvents, or glues. Even lacking a binder, the production process can result in a pellet that is hard, durable, and resistant to water intrusion without any additional additives. It is believed that the pressure and heat created during the production process produces a hard, durable pellet by taking advantage of binding properties of lignins and other naturally occurring substances in the plant derived material. A compact pellet can also be resistant to water absorption and can be subjected to water for short periods of time without a significant increase in moisture content. In certain implementations, pellet 100, as produced, has a low moisture content and can contain less than 20%, less than 15%, less than 10%, less than 5%, or less than 2% moisture, by weight. Ash content is dependent on the material from which pellet 100 is derived but can be less than 2%, less than 1%, or less than 0.5% by weight.

In some cases, waste paper and/or cardboard can be ground or shredded and used to produce pellets. The ground or shredded paper can include batches of material that has an average particle size of less than 10 mm, less than 5 mm, less than 3 mm, less than 2 mm or less than one mm. Similarly, the average area of each particle (one surface) can be less than 1 cm$^2$, less than 0.5 cm$^2$, less than 0.1 cm$^2$ or less than 0.05 cm$^2$. Pellets produced from waste paper can be compressed to a density where the hardness of the pellets approaches or equals the hardness of pellets produced from sawdust. In some cases, a binder can be mixed into the waste paper and/or the waste paper can include waxy or polymeric materials such as coated paper and coated paperboard. Upon compression, these polymers and waxes can help to bind particles together as well as improve imperviousness to water.

Pellet 100 optionally includes additional physical features such as a hole that is formed through central portion 120. The hole can be perpendicular to the major axis of the pellet. This hole can be useful in aligning, storing, and feeding multiple pellets in an organized fashion. It can also increase air flow, resulting in better combustion.

Due to its unique shape, pellet 100 can be easily fed into a burner by being aligned or self-aligning on a rail into the firebox. For some systems, pellets can be fed directly to a rail from a pile of randomly oriented pellets. Pellets may be fed into the burner one at a time or multiple pellets can be provided at once. The less dense central portion 120 of pellet 100 combusts first, but pellet 100 does not fall through the grate because the more dense peripheral portion 110, or outer ring, burns last and keeps pellet 100 suspended in the grate until substantially or entirely consumed. For instance, in various embodiments the pellet 100 can be greater than 50%, greater than 60%, greater than 70%, greater than 80% or greater than 90% combusted before un-combusted pellet material falls through the grate. This results in an efficient burning process where little or no un-combusted material falls through the grate to the floor of the firebox.

Figure 2:
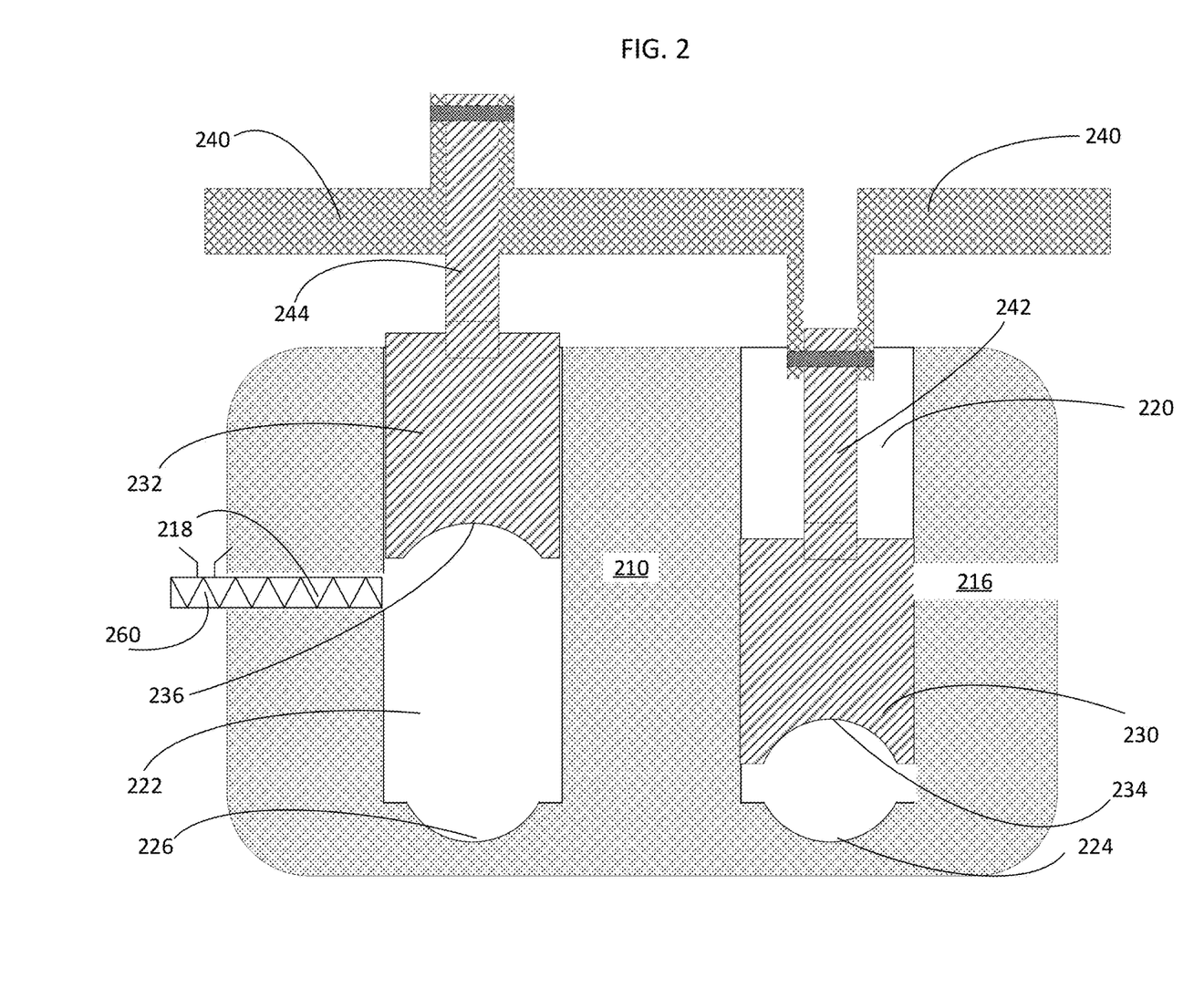
FIG. 2 is a cross-sectional view of an example two-cylinder apparatus for manufacturing a biofuel pellet.

FIG. 2 is a cross-sectional view of an example two-cylinder apparatus for manufacturing the biofuel pellet 100 illustrated in FIG. 1A through FIG. 1E. The embodiment illustrated shows a two cavity system, however one cavity, three cavities, four cavities, and more cavities are possible. A block 210 defines cylindrical cavities 220, 222 that can be identical and that can each include a concave portion 224, 226 that provides extra space for lower density sections of pellet 100. Each of cavities 220, 222 is mated with a corresponding piston head 230, 232. Each piston head 230, 232 also includes a concave surface 234, 236. Concave surfaces 234, 236 provide space for the lower density material in central portion 120 of pellet 100. Block 210 also defines passageways 216, 218 which can be used to feed biofuel precursor into each cylindrical cavity 220, 222. A crankshaft 240 is used to power the apparatus and provide downward pressure to piston heads 230, 232 to compress the biofuel precursor into the final shaped pellet 100. Note that while piston head 230 is fully extended, adjacent piston head 232 is fully retracted. In this way all of the power of the apparatus can be applied to the cavity needing the power to compress biofuel pellet 110 into its final form. If additional pistons are operated from crankshaft 240, corresponding piston rods 242, 244 can be spaced about crankshaft 240 so that no more than one cavity is at its maximum compression at any one time.

In practice, a fixed amount of biofuel precursor is fed to cylindrical cavity 220, 222 via corresponding passageway 216, 218. This biofuel precursor may be provided by either volume or weight and can be accurately fed using, for example, a screw feeder 260. As the process can be continuous, the biofuel precursor should be fed accurately and quickly into cylindrical cavity 220, 222 while corresponding piston head 230, 232 is still withdrawn above the inlet. After the proper amount of biofuel precursor has been added to cylindrical cavity 220, 222, the compression process can begin, and corresponding piston head 230, 232 moves downwardly until it reaches the position shown by fully-extended piston head 230. The dwell time at the bottom of the stroke is minimal, and the fully-extended piston head 230 can be withdrawn immediately after pellet 100 has been fully compressed. At this point, pellet 100 can be ejected from the cavity and the cycle can immediately repeat itself. The result is a consistent, precisely crafted biofuel pellet 100 that is ready for use without further drying or treatment.

Figure 3A:
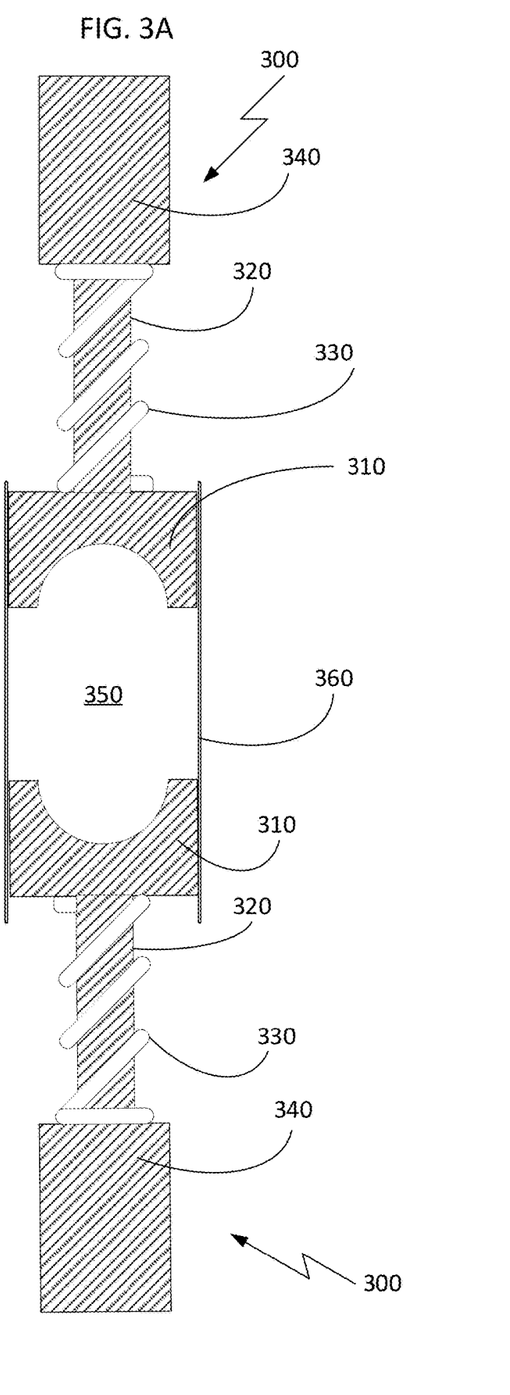
FIG. 3A is a cross-sectional view of an example bidirectional piston assembly that can be used for manufacturing a biofuel pellet.
Figure 3B:
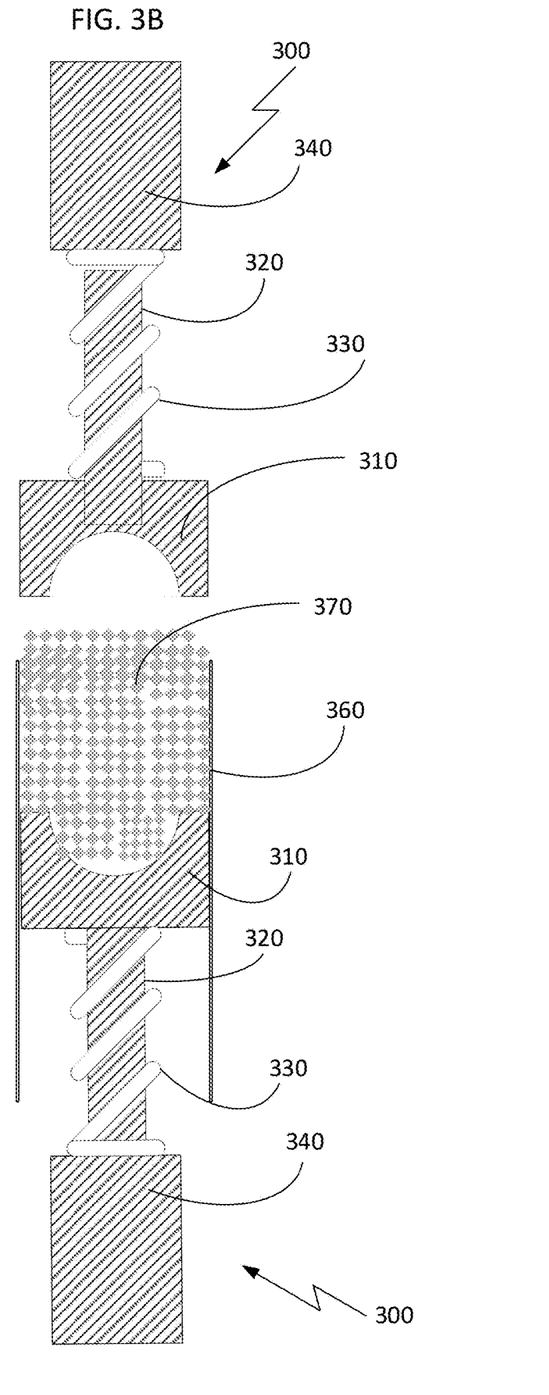
FIG. 3B is a cross-sectional view of the example bidirectional piston assembly of FIG. 3A, wherein biofuel precursor has been loaded into the piston assembly.
Figure 3C:
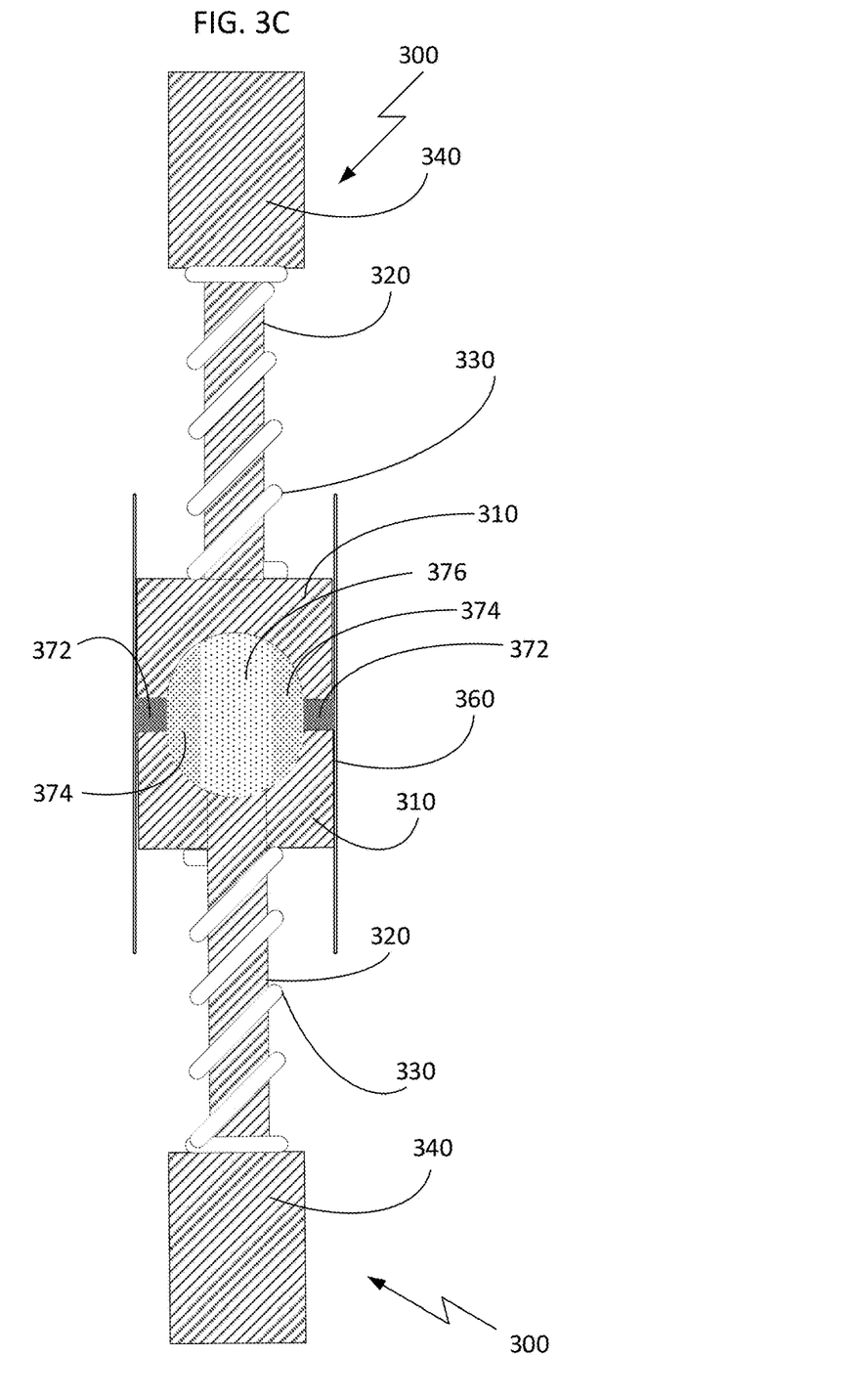
FIG. 3C is a cross-sectional view of the example of FIGS. 3A and 3B wherein the biofuel precursor has been fully compressed into a pellet of varying density.

FIG. 3A is a cross-sectional view of an example bidirectional piston assembly 300 that can be used for manufacturing a biofuel pellet. FIG. 3B is a cross-sectional view of bidirectional piston assembly 300 when loaded with biofuel precursor. FIG. 3C is a cross-sectional view of assembly 300 in fully compressed configuration. In some implementations bidirectional piston assembly 300 can be incorporated into a housing or block, similar to block 210 illustrated in FIG. 2. In such implementations the surrounding block includes interior walls 360 that define a cylindrical cavity 350. Bidirectional piston assembly 300 includes upper and lower crankshafts 340. Each of crankshafts 340 is mechanically coupled to a source of rotation (not illustrated), such as a flywheel that is coupled to an engine. In one implementation one or more drive chains or drivebelts are used to connect the flywheel to crankshafts 340. Each crankshaft 340 is coupled to a piston head 310 via a piston rod 320. Piston rod 320 is coupled to piston head 310 via a linkage that allows piston rod 320 to pivot with respect to piston head 310. This allows the rotational movement of crankshaft 340 to be translated to the linear motion of piston head 310. Optionally a spring 330 is positioned around piston rod 320, thus allowing piston head 310 to move with respect to, and be positioned at a variable distance from, crankshaft 340.

In operation cylindrical cavity 350 can be charged with biofuel precursor 370 at a time when at least one of piston heads 310 is at least partially retracted. As described above with respect to FIG. 2, biofuel precursor 370 can be provided to cylindrical cavity 350 via a passageway. Biofuel precursor 370 can be moved along the passageway using any suitable feed mechanism, for example via an air pressurization system, via a vacuum created due to retraction of piston head 310, or via a screw feeder. Once an appropriate quantity of biofuel precursor 370 is supplied to cylindrical cavity 350, piston head 310 moves through its compression cycle to compress biofuel precursor 370 into the lenticular shape illustrated in FIG. 1A through FIG. 1E. As shown in FIG. 3B, at maximum compression, flat peripheral surfaces of opposing piston heads 310 are relatively close to each other, and concave surfaces of opposing piston heads 310 are relatively further apart from each other. The amount of compression in the peripheral region of the piston heads is greater than in the central region of the piston heads due to a greater ratio of initial spacing to final spacing, after compression. Pellet region 372 is of the highest density, region 374 is of middle density and region 376 is of lowest density. The resulting pellet 100 has a relatively high-density peripheral portion 110 corresponding to the regions between the flat surfaces of piston heads 310, and a relatively low-density central portion 120 corresponding to the regions between the concave surfaces of piston heads 310.

In one implementation, spring 330 is used to facilitate ejection of a finished pellet from cylindrical cavity 350. For example, spring 330 can be configured to push piston head 310 out of cylindrical cavity 350, where the manufactured pellet can be removed via an extraction mechanism. Alternatively, piston assembly 300 can be configured such that when piston head 310 is at maximum retraction, piston head 310 is completely retracted from cylindrical cavity 350, thus allowing an extraction mechanism to remove the finished pellet from piston head 310. One example of such an extraction mechanism is a retractable pin or wedge that is coupled to a surrounding housing. Another example of such an extraction mechanism is a pivotable piston head that is capable of rotating with respect to piston rod 320, thus allowing the finished pellet to be "dumped" out of the rotatable piston head. Yet another example of an extraction mechanism can be accomplished by positioning piston assembly 300 horizontally, thus causing the finished pellet to fall out of the retracted piston head 310 due to gravitational forces. In some cases, ejection of the pellet can be promoted through the use of vibration or bursts of pressurized air flowed through conduits that pass through piston head 412 to the inner surface of the piston head where the pellet is formed.

Figure 4:
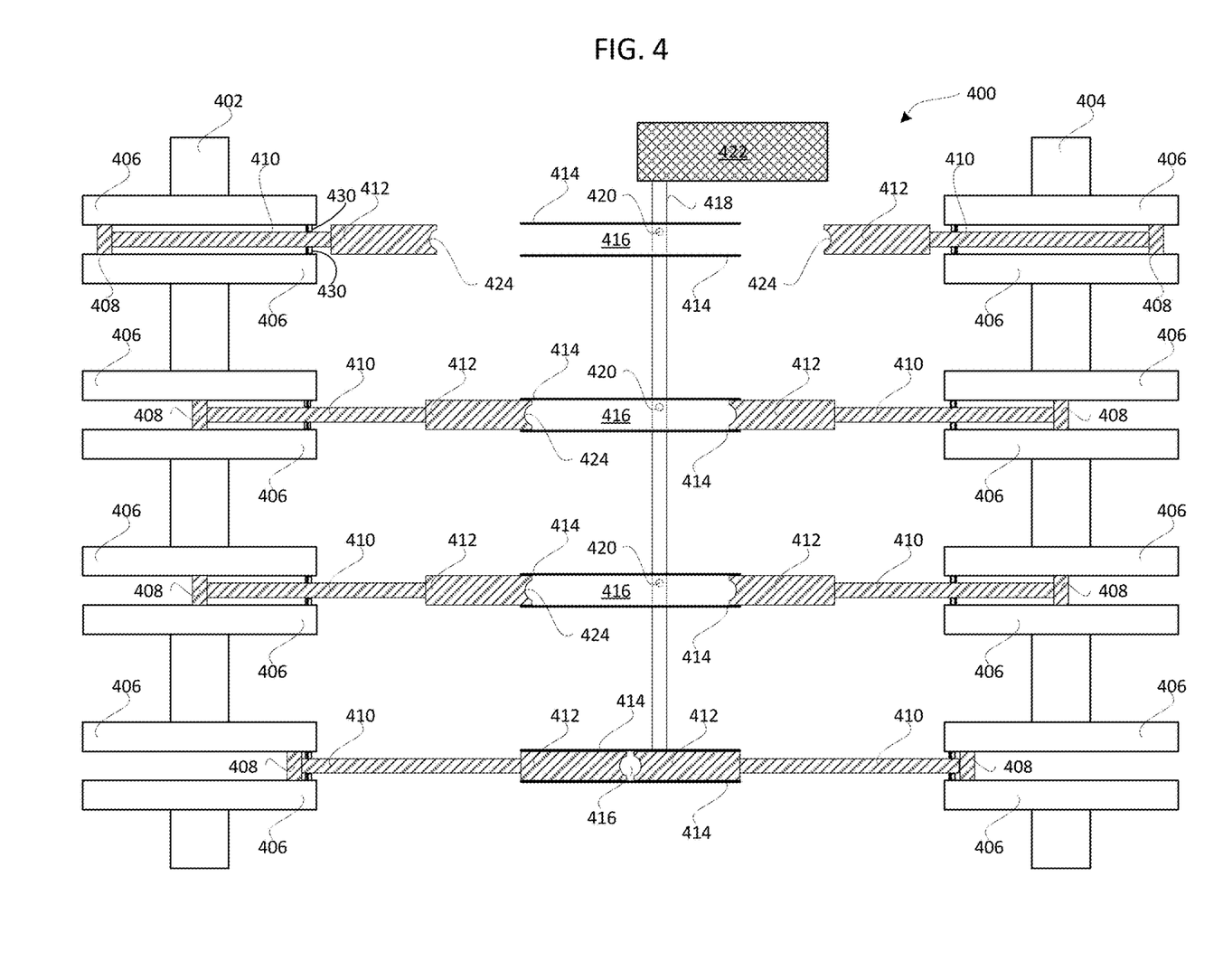
FIG. 4 is a cross-sectional view of an example four-cylinder apparatus for manufacturing a biofuel pellet.

FIG. 4 is a cross-sectional view of an example four-cylinder apparatus 400 for manufacturing a biofuel pellet. Apparatus 400 provides a bidirectional piston assembly, with two piston heads 412 movable into each of four cylindrical cavities 416. While four cylindrical cavities 416 are illustrated in FIG. 4, other implementations may include more or fewer cylindrical cavities, such as two, three, five, six, eight, ten, twelve, or more cylindrical cavities. In general, increasing the number of cylinders provides increased throughput and production rates. In some implementations apparatus 400 can be incorporated into a housing or block, similar to block 210 illustrated in FIG. 2. In such implementations the surrounding block includes interior walls 414 that define cylindrical cavities 416. Apparatus 400 includes a first crankshaft 402 and a second crankshaft 404. Each crankshaft includes a plurality of plates 406 connected via a pin 408. Pin 408 is rotationally coupled to a piston rod 410 that is kept in alignment with bushing 430. Piston rod 410 is, in turn, pivotally coupled to piston head 412. Apparatus 400 optionally includes a feed tube 418 that is connected to each cylindrical cavity 416 via a valve 420. Feed tube 418 is used to provide biofuel precursor to cylindrical cavities 416 from a hopper 422. In one implementation, apparatus 400 is positioned horizontally, thus facilitating ejection of a finished pellet from apparatus 400, for example as a result of the finished pellet falling away from a concave surface 424 of piston head 412.

Figure 5A:
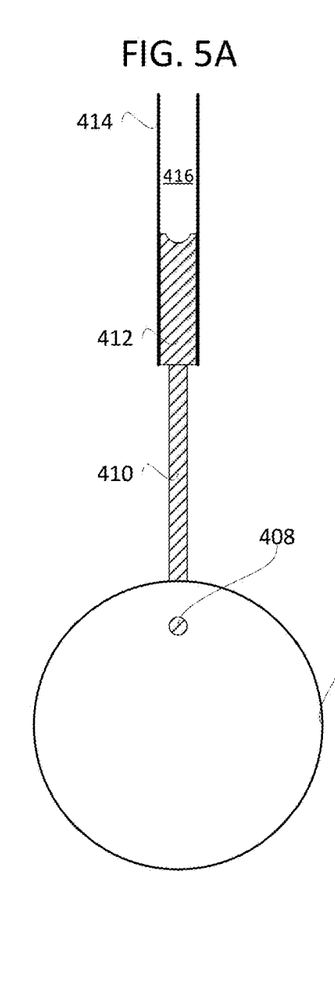
FIG. 5A is a cross-sectional view of an example piston assembly that can be used for manufacturing a biofuel pellet, wherein the piston assembly is in a fully extended position.
Figure 5B:
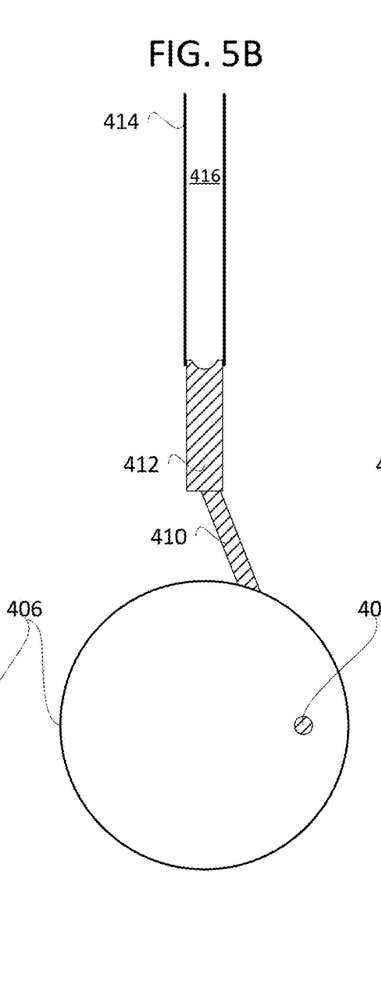
FIG. 5B is a cross-sectional view of an example piston assembly that can be used for manufacturing a biofuel pellet, wherein the piston assembly is in a partially retracted position.
Figures 5C, 5D:
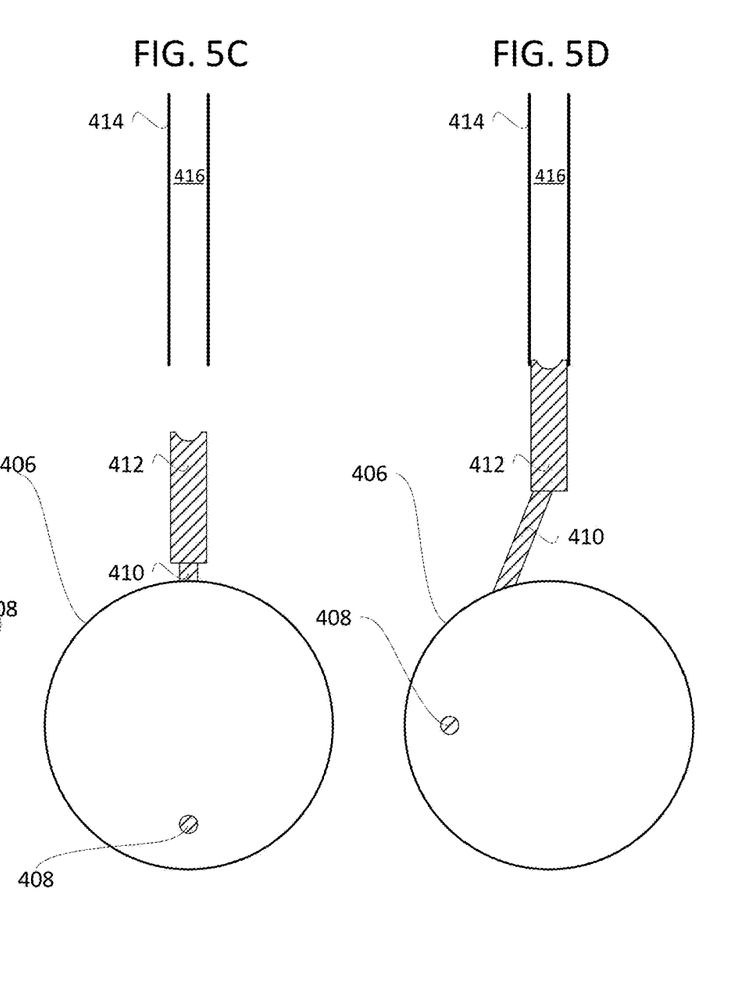
FIG. 5C is a cross-sectional view of an example piston assembly that can be used for manufacturing a biofuel pellet, wherein the piston assembly is in a fully retracted position.
FIG. 5D is a cross-sectional view of an example piston assembly that can be used for manufacturing a biofuel pellet, wherein the piston assembly is in a partially extended position.

FIGS. 5A through 5D provide cross-sectional views that illustrate the relative positions of plate 406, pin 408, piston rod 410, piston head 412, and interior walls 414 of cylindrical cavity 416 at various points in a pellet manufacturing process. In particular, FIG. 5A illustrates piston rod 410 at maximum extension, at which point piston head 412 is capable of applying maximum pressure to a manufactured pellet. FIG. 5B illustrates piston rod 410 in a partially retracted state following maximum extension. FIG. 5C illustrates piston rod 410 at maximum retraction, at which point a finished pellet can be removed from piston head 412. FIG. 5D illustrates piston rod 410 in a partially extended state following maximum retraction, at which point biofuel precursor can be fed into cylindrical cavity 416 in preparation for the next compression stroke. While FIG. 5A through FIG. 5D each illustrate a single piston head 412 for clarity, this single piston head 412 can be positioned opposite to a similar piston head that is movable into the same cylindrical cavity 416, as illustrated in FIG. 4.

Referring again to FIG. 4, the motion of opposing piston heads 412 is synchronized such that piston heads 412 reach maximum extension substantially simultaneously, at which point maximum pressure can be applied to a manufactured pellet. The bottom cylinder of FIG. 4 illustrates piston heads 412 at maximum extension. In such implementations the piston heads 412 do not contact each other at maximum extension, instead leaving a relatively narrow gap (corresponding to peripheral portion 110 of pellet 100), as well as a relatively wider gap adjacent to piston head concave surfaces 424 (corresponding to central portion 120 of pellet 100).

Likewise, when opposing piston heads 412 reach maximum retraction, at least one piston head 412 is withdrawn from cylindrical cavity, thus facilitating extraction of manufactured pellet from cylindrical cavity 416. While the example implementation illustrated in FIG. 4 illustrates both piston heads 412 withdrawn from cylindrical cavity 416 at maximum retraction, in alternative implementations one of piston heads 412 remains within cylindrical cavity 416 during the complete extension-retraction cycle. Keeping one of piston heads 412 within cylindrical cavity may facilitate efficient loading of biofuel precursor into cylindrical cavity during piston retraction and/or extension.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms. The indefinite articles "a" and "an", as used herein in the specification and in the claims, unless clearly indicated to the contrary, should be understood to mean "at least one". The phrase "and/or", as used herein in the specification and in the claims, should be understood to mean "either or both" of the elements so conjoined, that is, elements that are conjunctively present in some cases and disjunctively present in other cases. Other elements may optionally be present other than the elements specifically identified by the "and/or" clause, whether related or unrelated to those elements specifically identified, unless clearly indicated to the contrary. All references, patents and patent applications and publications that are cited or referred to in this application are incorporated in their entirety herein by reference.

What is claimed is:

1. A compressed biofuel comprising a pellet, the pellet having a central lenticular region having an outer edge and a peripheral portion comprising a cylindrical ring extending from the outer edge, the cylindrical ring having a diameter greater than a diameter of the outer edge, the central lenticular region exhibiting a first volumetric density and the cylindrical ring exhibiting a second volumetric density wherein the first volumetric density is less than the second volumetric density.

2. The compressed biofuel of claim 1 wherein the pellet comprises the same material throughout.

3. The compressed biofuel of claim 1 wherein the pellet comprises wood.

4. The compressed biofuel of claim 1 wherein the compressed biofuel does not include a binder.

5. The compressed biofuel of claim 1 wherein the cylindrical ring includes at least one planar surface in the same plane as a plane passing through the major axis of the central lenticular region.

6. The compressed biofuel of claim 1 wherein the central lenticular region has a first areal density and the cylindrical ring has a second areal density, wherein a ratio of the second volumetric density to the first volumetric density is greater than 1.5:1 and a ratio of the second areal density to the first areal density is less than 1.5:1.

7. The compressed biofuel of claim 6 wherein the ratio of the second volumetric density to the first volumetric density is greater than 2:1 and the ratio of the second areal density to the first areal density is less than 1.2:1.

8. The compressed biofuel of claim 1 wherein the cylindrical ring comprises a cylindrical outer surface.

9. The compressed biofuel of claim 1 wherein the second volumetric density is at least 3 times greater than the first volumetric density.

10. The compressed biofuel of claim 1 wherein the pellet defines a hole therethrough.

* * * * *